(12) United States Patent
Nosegbe (10) Patent No.: US 7,966,241 B2
(45) Date of Patent: Jun. 21, 2011

(54) STOCK METHOD FOR MEASURING AND ASSIGNING PRECISE MEANING TO MARKET SENTIMENT

(76) Inventor: Reginald Nosegbe, Ashburn, VA (US)

( * ) Notice: Subject to any disclaimer, the term of this patent is extended or adjusted under 35 U.S.C. 154(b) by 333 days.

(21) Appl. No.: 11/680,877

(22) Filed: Mar. 1, 2007

(65) Prior Publication Data

US 2008/0215498 A1    Sep. 4, 2008

(51) Int. Cl.
*G06Q 40/00*   (2006.01)
(52) U.S. Cl. .................................. 705/36 R
(58) Field of Classification Search .............. 705/37, 705/36 R
See application file for complete search history.

(56) References Cited

U.S. PATENT DOCUMENTS

| | | |
|---|---|---|
| 6,415,268 B1 | 7/2002 | Korisch |
| 6,473,084 B1 * | 10/2002 | Phillips et al. ............... 345/440 |
| 6,832,211 B1 | 12/2004 | Thomas et al. |
| 2002/0073017 A1 | 6/2002 | Robertson |
| 2002/0099636 A1 * | 7/2002 | Narumo ...................... 705/36 |
| 2002/0116310 A1 | 8/2002 | Cohen et al. |
| 2003/0135445 A1 * | 7/2003 | Herz et al. ................... 705/37 |
| 2004/4013349 | 7/2004 | Hedquist |
| 2005/0086150 A1 | 4/2005 | Serpico et al. |

OTHER PUBLICATIONS

Qihua Lin, Consumers' Information Search When Making Investment Decisions, Thesis submited to University of Georgia, 2002.*
Lois A. Mohr et al., Do Costomers Expect Companies to be Socially Responsible? the Impact of Corporate Social Responsibility on Buying Behavior, Journal of Consumer Affairs, vol. 35, No. 1, 2001.*
C. Alan Garner, Forecasting consumer Spending: Should Economists Pay Attention to Consumer Confidence Surveys?, Federal Reserve Bank of Kansas City Economic Reviiew, May/Jun. 1991, pp. 57-68.*

* cited by examiner

*Primary Examiner* — Alexander Kalinowski
*Assistant Examiner* — Chuks Onyezia
(74) *Attorney, Agent, or Firm* — Pillsbury Winthrop Shaw Pittman LLP (57) ABSTRACT

A stock method for objectively quantifying the feeling, or market sentiment, of a company's stock (or the market as a whole) in a data-driven and transparent manner that serves as a standardized tool useful to investors and stock market analysts in gauging such items as inflated or deflated price values resulting from varying levels of market sentiment.

6 Claims, 6 Drawing Sheets

$S_q$ Table
Sentiment Index/Sentiment Quotient Table

| SI | 0 | 0.1 | 0.2 | 0.3 | 0.4 | 0.5 | 0.6 | 0.7 | 0.8 | 0.9 |
|---|---|---|---|---|---|---|---|---|---|---|
| 0 | 0.0000 | 0.0909 | 0.1667 | 0.2308 | 0.2857 | 0.3333 | 0.3750 | 0.4118 | 0.4444 | 0.4737 |
| 1 | 0.5000 | 0.5238 | 0.5455 | 0.5652 | 0.5833 | 0.6000 | 0.6154 | 0.6296 | 0.6429 | 0.6552 |
| 2 | 0.6667 | 0.6774 | 0.6875 | 0.6970 | 0.7059 | 0.7143 | 0.7222 | 0.7297 | 0.7368 | 0.7436 |
| 3 | 0.7500 | 0.7561 | 0.7619 | 0.7674 | 0.7727 | 0.7778 | 0.7826 | 0.7872 | 0.7917 | 0.7959 |
| 4 | 0.8000 | 0.8039 | 0.8077 | 0.8113 | 0.8148 | 0.8182 | 0.8214 | 0.8246 | 0.8276 | 0.8305 |
| 5 | 0.8333 | 0.8361 | 0.8387 | 0.8413 | 0.8438 | 0.8462 | 0.8485 | 0.8507 | 0.8529 | 0.8551 |
| 6 | 0.8571 | 0.8592 | 0.8611 | 0.8630 | 0.8649 | 0.8667 | 0.8684 | 0.8701 | 0.8718 | 0.8734 |
| 7 | 0.8750 | 0.8765 | 0.8780 | 0.8795 | 0.8810 | 0.8824 | 0.8837 | 0.8851 | 0.8864 | 0.8876 |
| 8 | 0.8889 | 0.8901 | 0.8913 | 0.8925 | 0.8936 | 0.8947 | 0.8958 | 0.8969 | 0.8980 | 0.8990 |
| 9 | 0.9000 | 0.9010 | 0.9020 | 0.9029 | 0.9038 | 0.9048 | 0.9057 | 0.9065 | 0.9074 | 0.9083 |
| 10 | 0.9091 | 0.9099 | 0.9107 | 0.9115 | 0.9123 | 0.9130 | 0.9138 | 0.9145 | 0.9153 | 0.9160 |
| 11 | 0.9167 | 0.9174 | 0.9180 | 0.9187 | 0.9194 | 0.9200 | 0.9206 | 0.9213 | 0.9219 | 0.9225 |
| 12 | 0.9231 | 0.9237 | 0.9242 | 0.9248 | 0.9254 | 0.9259 | 0.9265 | 0.9270 | 0.9275 | 0.9281 |
| 13 | 0.9286 | 0.9291 | 0.9296 | 0.9301 | 0.9306 | 0.9310 | 0.9315 | 0.9320 | 0.9324 | 0.9329 |
| 14 | 0.9333 | 0.9338 | 0.9342 | 0.9346 | 0.9351 | 0.9355 | 0.9359 | 0.9363 | 0.9367 | 0.9371 |
| 15 | 0.9375 | 0.9379 | 0.9383 | 0.9387 | 0.9390 | 0.9394 | 0.9398 | 0.9401 | 0.9405 | 0.9408 |
| 16 | 0.9412 | 0.9415 | 0.9419 | 0.9422 | 0.9425 | 0.9429 | 0.9432 | 0.9435 | 0.9438 | 0.9441 |
| 17 | 0.9444 | 0.9448 | 0.9451 | 0.9454 | 0.9457 | 0.9459 | 0.9462 | 0.9465 | 0.9468 | 0.9471 |
| 18 | 0.9474 | 0.9476 | 0.9479 | 0.9482 | 0.9485 | 0.9487 | 0.9490 | 0.9492 | 0.9495 | 0.9497 |
| 19 | 0.9500 | 0.9502 | 0.9505 | 0.9507 | 0.9510 | 0.9512 | 0.9515 | 0.9517 | 0.9519 | 0.9522 |
| 20 | 0.9524 | 0.9526 | 0.9528 | 0.9531 | 0.9533 | 0.9535 | 0.9537 | 0.9539 | 0.9541 | 0.9543 |
| 21 | 0.9545 | 0.9548 | 0.9550 | 0.9552 | 0.9554 | 0.9556 | 0.9558 | 0.9559 | 0.9561 | 0.9563 |
| 22 | 0.9565 | 0.9567 | 0.9569 | 0.9571 | 0.9573 | 0.9574 | 0.9576 | 0.9578 | 0.9580 | 0.9582 |
| 23 | 0.9583 | 0.9585 | 0.9587 | 0.9588 | 0.9590 | 0.9592 | 0.9593 | 0.9595 | 0.9597 | 0.9598 |
| 24 | 0.9600 | 0.9602 | 0.9603 | 0.9605 | 0.9606 | 0.9608 | 0.9609 | 0.9611 | 0.9612 | 0.9614 |
| 25 | 0.9615 | 0.9617 | 0.9618 | 0.9620 | 0.9621 | 0.9623 | 0.9624 | 0.9625 | 0.9627 | 0.9628 |
| 26 | 0.9630 | 0.9631 | 0.9632 | 0.9634 | 0.9635 | 0.9636 | 0.9638 | 0.9639 | 0.9640 | 0.9642 |
| 27 | 0.9643 | 0.9644 | 0.9645 | 0.9647 | 0.9648 | 0.9649 | 0.9650 | 0.9652 | 0.9653 | 0.9654 |
| 28 | 0.9655 | 0.9656 | 0.9658 | 0.9659 | 0.9660 | 0.9661 | 0.9662 | 0.9663 | 0.9664 | 0.9666 |
| 29 | 0.9667 | 0.9668 | 0.9669 | 0.9670 | 0.9671 | 0.9672 | 0.9673 | 0.9674 | 0.9675 | 0.9676 |
| 30 | 0.9677 | 0.9678 | 0.9679 | 0.9681 | 0.9682 | 0.9683 | 0.9684 | 0.9685 | 0.9686 | 0.9687 |
| 31 | 0.9688 | 0.9688 | 0.9689 | 0.9690 | 0.9691 | 0.9692 | 0.9693 | 0.9694 | 0.9695 | 0.9696 |
| 32 | 0.9697 | 0.9698 | 0.9699 | 0.9700 | 0.9700 | 0.9701 | 0.9701 | 0.9702 | 0.9703 | 0.9704 | 
| 33 | 0.9706 | 0.9707 | 0.9708 | 0.9708 | 0.9709 | 0.9710 | 0.9711 | 0.9712 | 0.9713 | 0.9713 |
| 34 | 0.9714 | 0.9715 | 0.9716 | 0.9717 | 0.9718 | 0.9718 | 0.9719 | 0.9720 | 0.9721 | 0.9721 |
| 35 | 0.9722 | 0.9723 | 0.9724 | 0.9725 | 0.9725 | 0.9726 | 0.9727 | 0.9728 | 0.9728 | 0.9729 |
| 36 | 0.9730 | 0.9730 | 0.9731 | 0.9732 | 0.9733 | 0.9733 | 0.9734 | 0.9735 | 0.9735 | 0.9736 |
| 37 | 0.9737 | 0.9738 | 0.9738 | 0.9739 | 0.9740 | 0.9740 | 0.9741 | 0.9742 | 0.9742 | 0.9743 |
| 38 | 0.9744 | 0.9744 | 0.9745 | 0.9746 | 0.9746 | 0.9747 | 0.9747 | 0.9748 | 0.9749 | 0.9749 |
| 39 | 0.9750 | 0.9751 | 0.9751 | 0.9752 | 0.9752 | 0.9753 | 0.9754 | 0.9754 | 0.9755 | 0.9756 |
| 40 | 0.9756 | 0.9757 | 0.9757 | 0.9758 | 0.9758 | 0.9759 | 0.9760 | 0.9760 | 0.9761 | 0.9761 |
| 41 | 0.9762 | 0.9762 | 0.9763 | 0.9764 | 0.9764 | 0.9765 | 0.9765 | 0.9766 | 0.9766 | 0.9767 |
| 42 | 0.9767 | 0.9768 | 0.9769 | 0.9769 | 0.9770 | 0.9770 | 0.9771 | 0.9771 | 0.9772 | 0.9772 |
| 43 | 0.9773 | 0.9773 | 0.9774 | 0.9774 | 0.9775 | 0.9775 | 0.9776 | 0.9776 | 0.9777 | 0.9777 |
| 44 | 0.9778 | 0.9778 | 0.9779 | 0.9779 | 0.9780 | 0.9780 | 0.9781 | 0.9781 | 0.9782 | 0.9782 |
| 45 | 0.9783 | 0.9783 | 0.9784 | 0.9784 | 0.9784 | 0.9785 | 0.9785 | 0.9786 | 0.9786 | 0.9787 |
| 46 | 0.9787 | 0.9788 | 0.9788 | 0.9789 | 0.9789 | 0.9789 | 0.9790 | 0.9790 | 0.9791 | 0.9791 |
| 47 | 0.9792 | 0.9792 | 0.9793 | 0.9793 | 0.9794 | 0.9794 | 0.9794 | 0.9795 | 0.9795 | 0.9796 |
| 48 | 0.9796 | 0.9796 | 0.9797 | 0.9797 | 0.9798 | 0.9798 | 0.9798 | 0.9799 | 0.9799 | 0.9800 |
| 49 | 0.9800 | 0.9800 | 0.9801 | 0.9801 | 0.9802 | 0.9802 | 0.9802 | 0.9803 | 0.9803 | 0.9804 |
| 50 | 0.9804 | 0.9804 | 0.9805 | 0.9805 | 0.9805 | 0.9806 | 0.9806 | 0.9807 | 0.9807 | 0.9807 |
| 51 | 0.9808 | 0.9808 | 0.9808 | 0.9809 | 0.9809 | 0.9810 | 0.9810 | 0.9810 | 0.9811 | 0.9811 |
| 52 | 0.9811 | 0.9812 | 0.9812 | 0.9812 | 0.9813 | 0.9813 | 0.9813 | 0.9814 | 0.9814 | 0.9814 |
| 53 | 0.9815 | 0.9815 | 0.9815 | 0.9816 | 0.9816 | 0.9817 | 0.9817 | 0.9817 | 0.9818 | 0.9818 |
| 54 | 0.9818 | 0.9819 | 0.9819 | 0.9819 | 0.9819 | 0.9820 | 0.9820 | 0.9820 | 0.9821 | 0.9821 |
| 55 | 0.9821 | 0.9822 | 0.9822 | 0.9822 | 0.9823 | 0.9823 | 0.9823 | 0.9824 | 0.9824 | 0.9824 |
| 56 | 0.9825 | 0.9825 | 0.9825 | 0.9825 | 0.9826 | 0.9826 | 0.9826 | 0.9827 | 0.9827 | 0.9827 |
| 57 | 0.9828 | 0.9828 | 0.9828 | 0.9828 | 0.9829 | 0.9829 | 0.9829 | 0.9830 | 0.9830 | 0.9830 |
| 58 | 0.9831 | 0.9831 | 0.9831 | 0.9831 | 0.9832 | 0.9832 | 0.9832 | 0.9832 | 0.9833 | 0.9833 |
| 59 | 0.9833 | 0.9834 | 0.9834 | 0.9834 | 0.9835 | 0.9835 | 0.9835 | 0.9835 | 0.9836 | 0.9836 |
| 60 | 0.9836 | 0.9836 | 0.9837 | 0.9837 | 0.9837 | 0.9837 | 0.9838 | 0.9838 | 0.9838 | 0.9838 |
| 61 | 0.9839 | 0.9839 | 0.9839 | 0.9839 | 0.9840 | 0.9840 | 0.9840 | 0.9841 | 0.9841 | 0.9841 |
| 62 | 0.9841 | 0.9842 | 0.9842 | 0.9842 | 0.9843 | 0.9843 | 0.9843 | 0.9843 | 0.9843 | 0.9844 |
| 63 | 0.9844 | 0.9844 | 0.9844 | 0.9844 | 0.9845 | 0.9845 | 0.9845 | 0.9845 | 0.9846 | 0.9846 |
| 64 | 0.9846 | 0.9846 | 0.9847 | 0.9847 | 0.9847 | 0.9847 | 0.9848 | 0.9848 | 0.9848 | 0.9848 |
| 65 | 0.9848 | 0.9849 | 0.9849 | 0.9849 | 0.9849 | 0.9850 | 0.9850 | 0.9850 | 0.9850 | 0.9851 |
| 66 | 0.9851 | 0.9851 | 0.9851 | 0.9851 | 0.9852 | 0.9852 | 0.9852 | 0.9852 | 0.9853 | 0.9853 |
| 67 | 0.9853 | 0.9853 | 0.9853 | 0.9854 | 0.9854 | 0.9854 | 0.9854 | 0.9854 | 0.9855 | 0.9855 |
| 68 | 0.9855 | 0.9855 | 0.9856 | 0.9856 | 0.9856 | 0.9856 | 0.9856 | 0.9857 | 0.9857 | 0.9857 |
| 69 | 0.9857 | 0.9857 | 0.9858 | 0.9858 | 0.9858 | 0.9858 | 0.9858 | 0.9859 | 0.9859 | 0.9859 |
| 70 | 0.9859 | 0.9859 | 0.9860 | 0.9860 | 0.9860 | 0.9860 | 0.9861 | 0.9861 | 0.9861 | 0.9861 |
| 71 | 0.9861 | 0.9861 | 0.9861 | 0.9862 | 0.9862 | 0.9862 | 0.9862 | 0.9862 | 0.9863 | 0.9863 |
| 72 | 0.9863 | 0.9863 | 0.9863 | 0.9864 | 0.9864 | 0.9864 | 0.9864 | 0.9864 | 0.9864 | 0.9865 |
| 73 | 0.9865 | 0.9865 | 0.9865 | 0.9865 | 0.9866 | 0.9866 | 0.9866 | 0.9866 | 0.9866 | 0.9866 |
| 74 | 0.9867 | 0.9867 | 0.9867 | 0.9867 | 0.9867 | 0.9868 | 0.9868 | 0.9868 | 0.9868 | 0.9868 |
| 75 | 0.9869 | 0.9869 | 0.9869 | 0.9869 | 0.9869 | 0.9869 | 0.9869 | 0.9870 | 0.9870 | 0.9870 |
| 76 | 0.9870 | 0.9870 | 0.9870 | 0.9871 | 0.9871 | 0.9871 | 0.9871 | 0.9871 | 0.9871 | 0.9872 |
| 77 | 0.9872 | 0.9872 | 0.9872 | 0.9872 | 0.9872 | 0.9873 | 0.9873 | 0.9873 | 0.9873 | 0.9873 |
| 78 | 0.9873 | 0.9874 | 0.9874 | 0.9874 | 0.9874 | 0.9874 | 0.9874 | 0.9875 | 0.9875 | 0.9875 |
| 79 | 0.9875 | 0.9875 | 0.9875 | 0.9875 | 0.9876 | 0.9876 | 0.9876 | 0.9876 | 0.9876 | 0.9876 |
| 80 | 0.9877 | 0.9877 | 0.9877 | 0.9877 | 0.9877 | 0.9877 | 0.9877 | 0.9878 | 0.9878 | 0.9878 |
| 81 | 0.9878 | 0.9878 | 0.9878 | 0.9878 | 0.9879 | 0.9879 | 0.9879 | 0.9879 | 0.9879 | 0.9879 |
| 82 | 0.9880 | 0.9880 | 0.9880 | 0.9880 | 0.9880 | 0.9880 | 0.9880 | 0.9881 | 0.9881 | 0.9881 |
| 83 | 0.9881 | 0.9881 | 0.9881 | 0.9881 | 0.9882 | 0.9882 | 0.9882 | 0.9882 | 0.9882 | 0.9882 |
| 84 | 0.9882 | 0.9882 | 0.9883 | 0.9883 | 0.9883 | 0.9883 | 0.9883 | 0.9883 | 0.9883 | 0.9884 |
| 85 | 0.9884 | 0.9884 | 0.9884 | 0.9884 | 0.9884 | 0.9885 | 0.9885 | 0.9885 | 0.9885 | 0.9885 |
| 86 | 0.9885 | 0.9885 | 0.9885 | 0.9885 | 0.9886 | 0.9886 | 0.9886 | 0.9886 | 0.9886 | 0.9886 |
| 87 | 0.9886 | 0.9886 | 0.9887 | 0.9887 | 0.9887 | 0.9887 | 0.9887 | 0.9887 | 0.9887 | 0.9888 |
| 88 | 0.9888 | 0.9888 | 0.9888 | 0.9888 | 0.9888 | 0.9888 | 0.9888 | 0.9889 | 0.9889 | 0.9889 |
| 89 | 0.9889 | 0.9889 | 0.9889 | 0.9889 | 0.9889 | 0.9890 | 0.9890 | 0.9890 | 0.9890 | 0.9890 |
| 90 | 0.9890 | 0.9890 | 0.9890 | 0.9890 | 0.9891 | 0.9891 | 0.9891 | 0.9891 | 0.9891 | 0.9891 |
| 91 | 0.9891 | 0.9891 | 0.9892 | 0.9892 | 0.9892 | 0.9892 | 0.9892 | 0.9892 | 0.9892 | 0.9892 |
| 92 | 0.9892 | 0.9893 | 0.9893 | 0.9893 | 0.9893 | 0.9893 | 0.9893 | 0.9893 | 0.9893 | 0.9894 |
| 93 | 0.9894 | 0.9894 | 0.9894 | 0.9894 | 0.9894 | 0.9894 | 0.9894 | 0.9894 | 0.9895 | 0.9895 |
| 94 | 0.9895 | 0.9895 | 0.9895 | 0.9895 | 0.9895 | 0.9895 | 0.9896 | 0.9896 | 0.9896 | 0.9896 |
| 95 | 0.9896 | 0.9896 | 0.9896 | 0.9896 | 0.9896 | 0.9896 | 0.9896 | 0.9897 | 0.9897 | 0.9897 |
| 96 | 0.9897 | 0.9897 | 0.9897 | 0.9897 | 0.9897 | 0.9897 | 0.9897 | 0.9898 | 0.9898 | 0.9898 |
| 97 | 0.9898 | 0.9898 | 0.9898 | 0.9898 | 0.9898 | 0.9898 | 0.9899 | 0.9899 | 0.9899 | 0.9899 |
| 98 | 0.9899 | 0.9899 | 0.9899 | 0.9899 | 0.9899 | 0.9899 | 0.9900 | 0.9900 | 0.9900 | 0.9900 |
| 99 | 0.9900 | 0.9900 | 0.9900 | 0.9900 | 0.9900 | 0.9900 | 0.9901 | 0.9901 | 0.9901 | 0.9901 |
| 100 | 0.9901 | 0.9901 | 0.9901 | 0.9901 | 0.9901 | 0.9901 | 0.9902 | 0.9902 | 0.9902 | 0.9902 |
| ∞ | 0.9999 | 0.9999 | 0.9999 | 0.9999 | 0.9999 | 0.9999 | 0.9999 | 0.9999 | 0.9999 | 0.9999 |

| SI | 0 | -0.1 | -0.2 | -0.3 | -0.4 | -0.5 | -0.6 | -0.7 | -0.8 | -0.9 |
|---|---|---|---|---|---|---|---|---|---|---|
| Sq | 0.0000 | -0.1111 | -0.2500 | -0.4286 | -0.6667 | -1.0000 | -1.5000 | -2.3333 | -4.0000 | -9.0000 |

STOCK METHOD FOR MEASURING AND ASSIGNING PRECISE MEANING TO MARKET SENTIMENT

FIELD OF THE INVENTION

The present invention relates to a standard quantification method for assigning precise meaning to the feeling, or market sentiment, of company stocks and the stock market as a whole. More specifically, the present invention works by calculating such elements as a Sentiment Index and Sentiment Quotient, as well as applies these items to various embodiments such as the Market Sentiment Curve, so that the overall sentiment of a stock in relation to price valuation and other factors can ultimately be objectively quantified in a standardized and transparent manner.

BACKGROUND OF THE INVENTION

The stock market is often a rough and tumble world fall of volatility and intrigue. The stock market is deeply intertwined with the national and international economic structure. On the individual investor level, people's hopes and dreams can rise and fall along with the unpredictable directions of the stock market. For this reason, corporations and individuals alike pay enormous sums of money to try and gain an edge in maximizing profits through the stock market. As a result, numerous people are tasked with the job of trying to figure out which way the market will turn for individual stocks on the market. A number of ideas and strategies have been funneled into the process of helping investors determine the various scenarios surrounding their stocks. But in the end, these same practitioners are basically involved in what amounts to a high-stakes guessing game. In fact, since the Industrial Revolution, the ability of the average investor and other market participants to predict the vast idiosyncrasies of the stock market has largely been driven by speculation. Numerous attempts and tools have been adopted over the years to better predict what stocks will do, but to date, there has been no reliable indicator to predict the rise and fall that goes along with the stock market. Over the last 100 years, the U.S. capital market has experienced nine crashes greater in magnitude than the catastrophic market crash of 2000/2002. These market failures have been occasioned by what the Federal Reserve Chairman, Alan Greenspan, called "Irrational Exuberance"[1] and other market practitioners called speculative bubble. The expression of one's subjective feeling that the market is driven by speculation has not been sufficient to protect investors. Prevailing theories—the Modern Portfolio Theory, the Efficient Market Hypothesis, etc—that underlie the discipline and the practice of finance, and the workings of capital markets are no longer tenable; they neither explain the behavior of markets nor do they provide information necessary for investors to make informed and sound investment decisions. These theories proved useless to investors when the broadest indicators of a diversified market lost vast percentages. Investors lost "70%, 90%, even in some cases all of their holdings"[2]. A crash of this magnitude is not an aberration; it is a pattern that has robbed millions of individuals of their life's savings for over a century. The methods, processes, and tools that this invention embodies make a contribution to solving this problem by making available standardized and objective metrics and methods for quantifying and measuring market sentiment.

[1] http://www.fereralreserve.gov/BOARDDOCS/SPEECHEES/19961205.htm.
[2] Fortune Magazine, Sep. 2, 2002, "You Bought, They Sold"

Information gap which increases the risk and volatility of the capital market is another problem that the present invention is designed to make a contribution to solving. A large percentage of the more than 10,000 companies traded on the U.S. stock market alone are not followed by analysts. The lack of analysts researching these stocks presents a gap in reliable information that investors need in order to make informed investment decisions. The present invention satisfies these needs by providing an efficient method of filling the gap with information on the market valuation of stocks. With a tool for quickly and consistently quantifying the portion of a company's stock that is attributable to market sentiment in the hands of investors, they can effectively place demands on research analysts to produce specific research information that supports or justifies the market valuation of companies traded on the exchanges. For example, armed with information on the value of the portion of the company's stock that is attributable to market sentiment, investors can demand directly from a company's management information (financial, operations or market) that supports the company's valuation. Also, if the company does not satisfy requesters' demand for information regarding possession of competitive advantage enabling it to sustain (for example) an above average Sentiment Quotient, then market participants' demand for the company stock will fall. In that event, a reduction in the demand for a company stock will have the effect of occasioning a drop in the price of the stock; a drop in the price of the stock will have an effect of reducing the risks associated with a stock market driven by speculative Bubble or Exuberance.

The metrics, processes, methods, and tools embodied in the present invention provide a new approach for investors to gain transparency and insight into the market pricing of stocks. Instead of pure speculative or otherwise traditional attempts at market analysis to solving the intractable problem of market failure, there is a need for a multi-disciplinary approach toward the stock market—one that employs elements of accounting, finance, risk management, humanitarianism combined with the discipline of systems and information engineering. The methods introduced by the present invention satisfy the needs of market participants by making available to society standardized, quantitative benchmarks, and tools that have the utility of transforming the behavior and improving the performance of capital markets in the U.S. and across the world.

U.S. Pat. No. 6,415,268 issued to Korisch on Jul. 2, 2002, is a method attempting to determine the "real" value of a stock by dividing certain stock pricing data into two components. This method specifically involves an analysis of the "real value of the stock" along with a random function of time, which is referred to in that method as the "noise wave of a stock." Unlike the present invention, the method as created by Korisch does not delve into a standardized indicator and measurement of market sentiment, but instead relies on less in-depth and more typical items as the short-term fluctuations that can be attributed to such elements as short-term investors.

U.S. Pat. No. 6,832,211 issued to Thomas et al on Dec. 14, 2004, is a method that relies on such tangible indicators as related to technology-based elements. Unlike the present invention, this method as created by Thomas et al relies almost exclusively on such technology-based valuation indicators as scientific research by the company in question, as well as the speed at which this company innovates and research and development links. The very nature of this method differs from the present invention because of the limits on what type of company stock values can be applied based on the technology-based indication focus.

US 2002/0073017 published on Jun. 13, 2002, invented by Robertson, is a method that seeks to employ historical data related to a particular stock in order to rapidly analyze the trading potential. Unlike the present invention, this method does not delve into the area of market sentiment and instead relies on traditional information revolving around the actual history of the stock to present two graphical displays.

US 2002/0116310A1 published on Aug. 22, 2002, invented by Cohen et al, is a method that utilizes a scoring technique to ultimately engage in an unlimited number of comparative stock analysis. Unlike the present invention, this method is primarily functioned to aid investors by customizing scoring criteria for each stock portfolio in an effort to score the comparisons between differing stocks rather than an analysis capability for one specific company stock. This method also does not take into account market sentiment in its comparative analysis.

US 2003/0135445 published on Jul. 17, 2003, invented by Herz et al, is a method seeking to aid investors in predicting elements of company stocks by using "natural language processing" to extract company information from various online news sources. Unlike the present invention, this method does not delve into actual market sentiment and related indicators directly relevant to the stock price, but instead literally takes information from online mediums to predict the stock market. This method differs from the present invention in many ways, including the fact that, unlike the present invention, this method relies solely on online media coverage to make its predictions.

US 2004/40133496 published on Jul. 8, 2004, invented by Hedquist, is a method seeking to determine the health of both the stock market and individual company stocks. Unlike the present invention, this method relies on such items as closing price compared to short and long-term moving averages to quantify a health score for the market.

US 20050086150 published on Apr. 21, 2005, invented by Serpico et al, is a method that creates an algorithm in an attempt to make a veritable point system acting as filters to either encourage or discourage actions regarding various company stocks. Unlike the present invention, this method attempts to employ a three-pronged filter system related to certain technical indicators as opposed to such elements of the present invention including a Market Sentiment Curve.

While there are plenty of methods out there attempting to aid investors in navigating the stock market, none of them satisfies the need for a standard, precise meaning to market sentiment as associated with the present invention. None of these previous methods permit an investor or analyst to study the intensity of market sentiment on a company stock in an objective and standardized way as the methods of this invention enable. Such methods that are included in the present invention as the Market Sentiment Curve, along with the Sentiment Index, and Sentiment Quotient, all are combined into a unique approach designed to ultimately improve and make accessible quantifiable methodology to benefit investors.

As mentioned above, the stock market is a volatile and unpredictable element of society that faces such related issues as bubble, euphoria, psychology, sentiment and even "irrational exuberance" as quoted by former Federal Reserve Chairman Alan Greenspan. In addition, previous methods have failed to specifically address the problem of market valuation of company stock in regard to portions that are not explained by the current operating performance and associated risks of various companies. Nothing out there allows investors the opportunity to use information about a company stock in order to determine the feeling, or market sentiment, surrounding that stock in an analytical, standardized, objective way as the methods that this invention do. The methods as prescribed in the present invention satisfies that need by providing standard quantifications that can be used as a tool to ultimately support determinations of price valuation relating to market sentiment. A standard, complete method designed to assign precise meaning to the market sentiment of the stock market is not only needed, but also necessary for those who risk their finances in the stock market as well as for those who desire transparency and strategy.

SUMMARY OF THE INVENTION

The present invention relates to a standard quantification method for assigning precise meaning to the feeling, or market sentiment, of company stocks and the stock market as a whole. More specifically, the present invention works by calculating such elements as a Sentiment Index and Sentiment Quotient so that the intensity and overall sentiment of a stock in relation to transparent price valuation and other factors can ultimately be studied through an interface called Market Sentiment Curve.

The present invention provides objective standards, methods, and processes, and an interface—the Market Sentiment Curve—for quantifying and assigning precised meaning to the feeling, or market sentiment, of company stocks and the stock market as a whole. The invention utilizes various indicators to ultimately produce an objective and systematic quantification of the portion of a company's market valuation that is derived from market sentiment, or the feelings and expectations of market participants. It also includes an additional embodiment for standardizing the process of quantifying and classifying the market valuation of a company or the market as a whole as "Bubble," "Exuberant," or "Lethargic." The present invention derives a number of new metrics for quantifying and measuring market sentiment, including 1. Sentiment Index (Si), 2. Sentiment Quotient (Sq), and 3. Change in Sentiment Quotient ($S_{qA}$). Additionally, items such as price per share, expected return and earnings per share are integral to the methods of the present invention. Together, these metrics objectively quantify and measure the portion of the market value (stock price) of a company (or the market as a whole) that is driven by speculations, not a company's current operating performance.

These metrics and methods of the present invention all serve in part to enable investors and others involved in the stock market to make informed decisions within the confines of a standardized, objective, transparent and all-encompassing informational approach. In short, the present invention takes a number of factors into account and quantifies them into standard metrics. These calculations are then graphed on a logistic curve—The Market Sentiment Curve—so that the feeling, or sentiment, surrounding the stock market or individual stock is depicted. Once a point is plotted based on the Sentiment Index for the graph's horizontal axis and the Sentiment Quotient for the vertical axis, the intensity of market sentiment relating to a stock can be studied. The numbers gleaned from this method can provide standardized results that could serve as an objective basis for the analysis of such items as price valuation and price inflation or deflation due to high or low sentiment or feeling.

In addition, the indicators of the present invention provide a method of understanding and interpreting the market value of company stocks. The Market Sentiment Curve is a key element of the present invention. The Market Sentiment Curve is designed to quickly interpret the valuation indicators and ultimately make them available to investors. Plotting the coordinate of the Sentiment Index and the Sentiment Quotient derives the Market Sentiment Curve. In essence, the points on the Market Sentiment Curve can be plotted on a minute-by-minute basis, year-to-year or any other time frame that best fits the needs of the individual investor or analyst.

The present invention has various items that serve to obtain useful elements relating to market sentiment. Again, this includes price per share, rate of return and earning per share among other factors. These indicators then can be used to determine the Sentiment Index. The Sentiment Index is a standardized indicator and measure of market sentiment toward a company's stock market price. In addition, the market value partitioning factor, here known as the Sentiment Quotient, is a standardized measure of the portion of a company's stock market price that is attributable to market sentiment.

Once the calculations of each of these items are made, the results relating to the Sentiment Index and Sentiment Quotient can be used to study the sentiment of the stock. As noted above, the Sentiment Index is plotted using the horizontal axis and the Sentiment Quotient is plotted using the vertical axis. Based on the results and course of time, a curve will appear on the graph. This curve is used to visually display a quantification of the feeling, or market sentiment, surrounding stocks on the stock market. Investors and others involved in the stock market can then use the graph and results of the present invention to understand the feeling surrounding a company stock instead of merely relying on typical intangibles. The points on the graph based on the results gained from the Sentiment Index and Sentiment Quotient indicates the intensity of the market sentiment. In general, a lukewarm result may indicate to an investor that a company stock price has good percentage of value in its price due to the lack of inflation attributed to market sentiment. Conversely, a high result could reveal that the price value of a stock is inflated due to strong feelings associated to the stock. The present invention is designed to quantify and standardize this vital aspect to better assist investors, analysts and anyone else associated with the stock market.

The metrics and methods that the present invention embodies are designed to be applied to the stock market as a whole, market sectors, industries, and individual securities traded on stock exchanges in the United States and other capital markets across the world. The present invention derives the following metrics for quantifying and measuring market sentiment: 1) Sentiment Index (Si), 2) Sentiment Quotient (Sq), and 3) Change in Sentiment Quotient ($S_{q\Delta}$). Together, these metrics objectively standardize the process for quantifying and measuring the portion of the market value (stock price) of a company (or the market as a whole) that is driven by speculations, not a company's current operating performance.

The mathematical formulas for the present invention provide a method to ultimately standardize the process for quantifying and the measuring market sentiment through such embodiments as the Market Sentiment Curve.

Below is the mathematical formulation of Sentiment Index at a point in time:

$$S_i = \frac{Pps \times r - Eps}{Eps}$$

Below is the mathematical formulation of the Sentiment Quotient at a point in time:

$$S_q = \int_0^{S_i} \frac{1}{(s_i + 1)^2} ds_i$$

Below is the mathematical formulation of the Change in Sentiment Quotient over time:

$$S_{q\Delta} = \int_{S_{i(TimeA)}}^{S_{i(TimeB)}} \frac{1}{(s_i + 1)^2} ds_i$$

The metrics of the present invention also include mathematical formulas that ultimately lead to various algorithms that can be applied to additional embodiments of the present invention.

Formula 1:

$$Bubble = \left[\left(\frac{PPS \times r - Eps}{Eps}\right) > (Profit\Delta_{YtoY})\right] \text{ AND } \left[\int_0^{S_i} \frac{1}{(s_i+1)^2} ds_i >= 0.5\right]$$

Formula 2:

Exhuberant =

$$\left[\left(\frac{PPS \times r - Eps}{Eps}\right) > (Profit\Delta_{YtoY})\right] \text{ AND } \left[\int_0^{S_i} \frac{1}{(s_i+1)^2} ds_i >= 0\right]$$

Formula 3:

Lethagic =

$$\left[\left(\frac{PPS \times r - Eps}{Eps}\right) < (Profit\Delta_{YtoY})\right] \text{ AND } \left[\int_0^{S_i} \frac{1}{(s_i+1)^2} ds_i < 0\right]$$

Where

PPS=Price per Share. The method obtains PPS (Price per Share) from publicly available market data.

EPS=Earning Per Share. The method uses available EPS (Earning per Share) data provided by audited financial statements, under Generally Acceptable Accounting Principal Standards.

r=Expected Return. The Capital Asset Pricing Model provides a method for calculating "r": $r=r_f+\beta(m_r-r_f)$[3]

[3] William Sharpe (1964) published the capital asset pricing model (CAPM). Parallel work also was performed by Treynor (1961) and Lintner (1965). CAPM extended Harry Markowitz's portfolio therory to introduce the notions of systematic and specific risk. For his work on CAPM, Sharpe shared the 1990 Nobel Prize in Economics with Harry Markowitz and Merton Miller http://www.riskglossary.com/link/capital_asset_pricing_model.htm Where:
   $r_f$=risk free premium (t-bill rate);
   $m_r$=average market return
   β=Beta (a measure of systematic risk of a stock);

$\beta=COV(i_s,i_m)/\sigma_m^2$

Where:
      COV $(i_s,i_m)$=Covariance between stock return, and market return
      $\sigma_m$=Standard deviation of systematic return
   Profit$\Delta$Y to Y=Percent change in Corporate Profit over a year The Sentiment Index is an objective, quantifiable method for categorizing the market's sentiment towards a company as positive, negative or neutral at a point in time. The Sentiment Index also standardizes and quantifies the market's sentiment or expectation of increase in a company's operating performance (profit) built into a company's stock market value at a point in time. The Sentiment Index provides an input to the calculation of the Sentiment Quotient associated with the market valuation of a stock at a point in time The Sentiment Quotient is a standardized metrics for objectively quantifying the fraction of a stock's price that is attributable to market sentiment or quantifying the sentiment value that the market associates with a company's stock price at a point in time. Meanwhile, the Sentiment Quotient Delta measures change in company's (or the market as a whole, sector, etc) sentiment value that the market associates with a company's stock price over time. It is used to performed historical and trend analysis.

An additional embodiment of this invention is the standardization and classification of individual stocks or the market as a whole as "Bubble," "Exuberant," or "Lethargic." The present invention uses the metrics described above to develop algorithms that:

Classifies the market valuation of a stock (the market as a whole, Sector, Industry, or portfolios) as "Bubble," "Exuberant," or "Lethargic"

Assigns appropriate color code

Below are the algorithms that the present invention uses to automate the classification process:

If a company's Sentiment Index at a point in time is greater than the company's actual percent increase in profit over a year AND the company's Sentiment Quotient is greater than 0.5 than the method classifies the market valuation of the company's stock as "Bubble" and assigns a color code of "Red."

If a company's Sentiment Index at a point in time is greater than the company's actual percent increase in profit over a year AND the company's Sentiment Quotient is greater than 0, than the method classifies the market valuation of the company's stock as "Exuberant" and assigns a color code of "Yellow."

If a company's Sentiment Index at a point in time is less than the company's actual percent increase in profit over a year AND the company's Sentiment Quotient is less than 0, than the method classifies the market valuation of the company's stock as "Lethargic" and assigns a color code of "Green."

BRIEF DESCRIPTION OF THE DRAWINGS

FIG. 2 is a table relating to an additional embodiment of the present invention

DETAILED DESCRIPTION OF THE PREFERRED EMBODIMENT(S)

Figure 1:
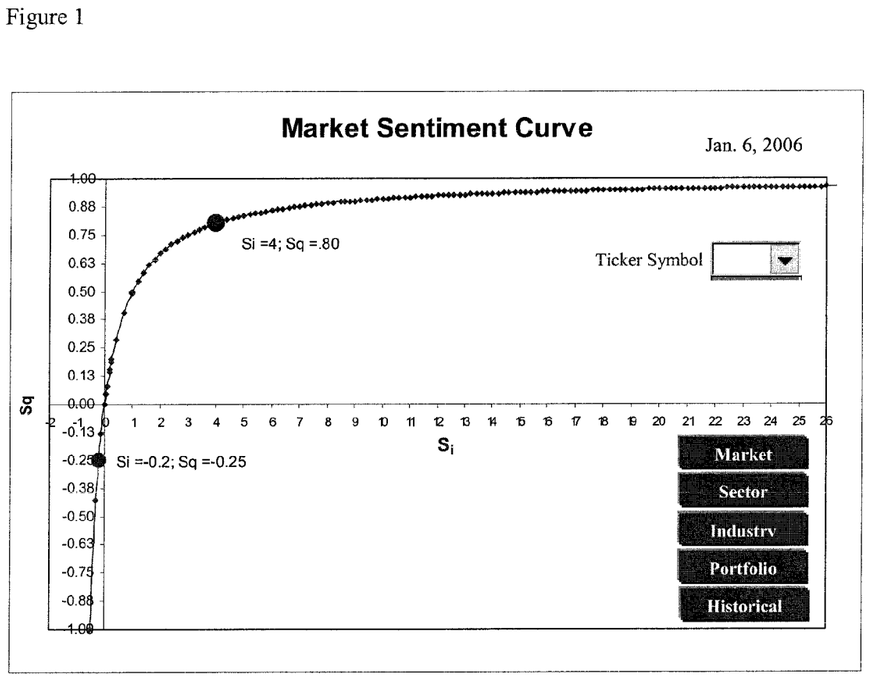
FIG. 1 is a general view of a Market Sentiment Curve as applied to the present invention.

FIG. 1 shows a graph of the Market Sentiment Curve of the present invention. The Market Sentiment Curve is derived from the accumulation of various elements of data. This information is gleaned from items related to the company stock such as price per share, earnings per share, risk and rate of returns. All of the information is brought together into quantifiable formulas, all relating to differing areas of feeling, or market sentiment. From there, a market sentiment index is derived. After the market Sentiment Index is calculated, the number pertaining to the Sentiment Quotient is derived. Once these elements are worked out, the results are applied to the graph. The primary element of the present invention relates to the Sentiment Quotient and the Sentiment Index. As seen in FIG. 1, the Sentiment Quotient is charted by the vertical axis and the sentiment index is charted by the horizontal axis. These two elements of the present invention are then plotted onto the graph. The Market Sentiment Curve can then be studied and continuously plotted based on the individual needs of the investor or analyst.

Whether it is part of the Market Sentiment Curve or simply to achieve the actual number for analysis, the Sentiment Index and Sentiment Quotient contribute greatly to the method of the present invention. The Sentiment Index is an indicator of the portion of a company's stock price that is attributable to market sentiment. The Sentiment Index is used to provide an objective indication and standard measure of various states of market feeling or sentiment toward a particular company stock. Such states of market sentiment include positive/optimistic feelings, neutral or negative/pessimistic feelings. As mentioned above, the sentiment index is comprised of many tangible factors such as price per share and earnings per share.

Meanwhile, the Sentiment Quotient can also be regarded as a market value partitioning factor. The Sentiment Quotient is integral to the present invention in that it essentially is a quantification of a portion of a company's market value that is attributed to market psychology or general feeling or sentiment. The sentiment quotient is used in conjunction with the Sentiment Index to ultimately establish a standard, transparent and meaningful tool as prescribed by the present invention. Most importantly, the graphing or table representation of the sentiment index versus the sentiment quotient, especially over time, is a subject of the present invention.

The elements of the present invention and resulting Market Sentiment Curve all serve to quantify the overall feeling of company stocks. This feeling, known as market sentiment, provides investors and others involved in the stock market with a standard, quantifiable method from which to make their investment decisions or even to merely gain information on the company stock or market in general. Basically, the numbers derived into the Market Sentiment Curve can be used to make an educated, tangible investment decision.

When determining the Market Sentiment Curve, the first step when dealing with a particular company stock is to calculate the Sentiment Index. That point will be plotted through the horizontal axis. The Sentiment Quotient will then be derived and plotted on the vertical axis. Once the company stock is plotted on the graph, that positioning will enable the investor to learn a great deal about the price of the stock. In addition, these points can be plotted on a minute-to-minute basis or month-to-month depending on the needs of the investor. This makes the present invention viable to a day trader as much as for a market analyst or traditional investor.

When studying the resultant Market Sentiment Curve as shown in FIG. 1, an investor can learn about the intensity of positive or negative feelings surrounding a company stock. As the graph in FIG. 1 indicates, a Sentiment Quotient around −0.25 can be considered to have somewhat negative feelings or sentiment. But over the course of time if we assume the market reaction value curve followed the example in FIG. 1, then we can see how the feelings or sentiment continue to increase. This example tells us how an investor could view the stock as a good buy with little value inflation due to sentiment until it ultimately reaches a Sentiment Quotient of around 0.80. At that point, the stock price could be deemed vastly inflated in regard to sentiment and not such a good buy anymore in terms of value. Investors and analysts can study the graph to make these determinations.

In addition to the Market Sentiment Curve, investors and others involved in the stock market are not limited to plotting and graphing the results of the calculations. As seen in FIG. 2, the present invention creates a standard quantification of market sentiment through the Sentiment Index and Sentiment Quotient. FIG. 2 shows us a standard table of the present invention that can be used similar to a common multiplication table one might recall from elementary school math class. The table in FIG. 2 is an additional embodiment of the present invention that features all potential results derived from the calculations for the Sentiment Index and Sentiment Quotient. Similar as is done in the market value reaction curve as seen in FIG. 1, the table in FIG. 2 is used by locating the Sentiment Index of a company stock and then locating the corresponding Sentiment Quotient of that company stock. The table in FIG. 2 then becomes an additional embodiment of the present invention where it can be used to study the market sentiment of a stock in relation to such items as price valuation and the inflation and deflation of a company stock in direct relation to market sentiment. It should be recognized that calculating a Sentiment Index for the stock price is providing a number based on the intensity of feeling that the user associates with a particular stock.

While the user can use items such as that shown in FIG. 2, the user also has other options in regard to further technological and Web-based embodiments of the present invention as seen in FIG. 1. The present invention, as indicated in FIG. 1, shows how the coordinate (the exact position) of a company's Sentiment Index and its Sentiment Quotient lies on a logistic curve. The logistic curve—Market Sentiment Curve—derived by plotting the Sentiment Index and the Sentiment Quotient, is an interface of the present invention developed to give the user a composite and simple device for using the metrics and methods of the present invention to quickly gain insights that would lead to a more informed investment decision. To use this tool as shown in FIG. 1, the user can access a web-based application; the user then would enter the ticker symbol of the company of interest or click on a pull-down menu and select the ticker symbol that he/she would like to gain insight into. Valuation metrics associated with the ticker symbol selected by the user is displayed on the Curve. The application that supports the Market Sentiment Curve as shown in FIG. 1 of the present invention has embedded in it the logic for accessing, summarizing, and presenting the metrics described in the present invention at the user's request. Web-based tools such as XML, Web-services and agent applications can then enable the application.

FIGS. 3, 4, 5 and 6 are additional embodiments of the present invention. FIGS. 3, 4, 5 and 6 use the scenario below to illustrate the utility of the valuation metric and Market Sentiment Curve. The following is an example of additional embodiments of the present invention applied to realistic, practical scenarios:

Assume that today is Jan. 6, 2006, and you are contemplating making an investment in the following companies: MICROSOFT™, MOVADO™, and TOLL BROTHERS™. You have a feeling about the market valuation of these companies, but before making a decision whether or not to buy these company stocks, you would like to obtain analysis that is free of bias. You read the financial press and analysts have different opinions about the valuation and prospects of these companies. You need objective information that would give you insight into the valuation of these companies. Analyst reports, even if available, are expensive and in some cases biased. You decide to use the valuation methods and Market Sentiment Curve of the present invention to quickly analyze these securities in order to make informed investment decision.

Figure 3:
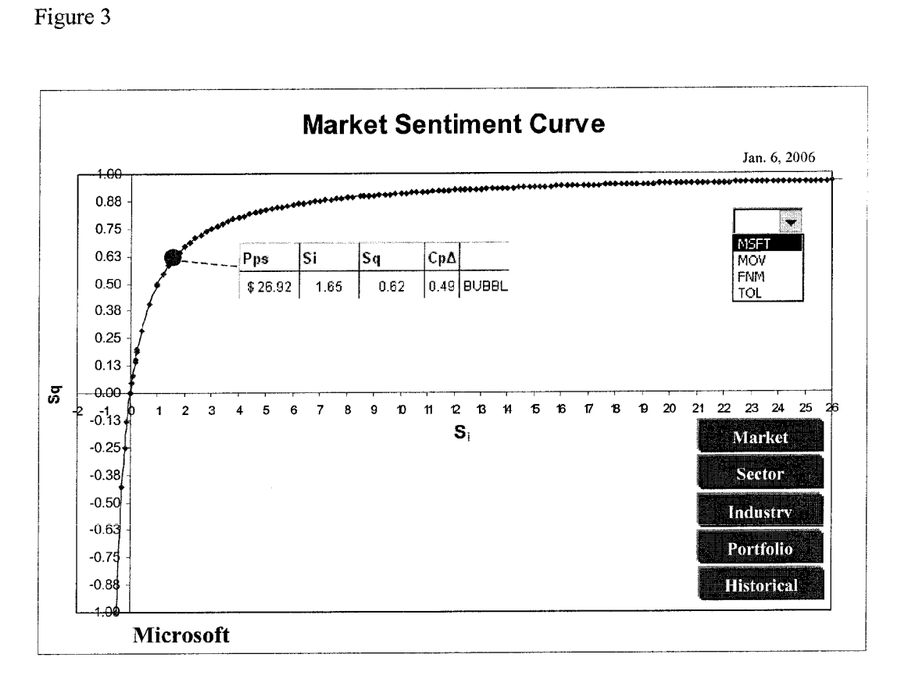
FIG. 3 is an embodiment of the Market Sentiment Curve as applied to the present invention pertaining to an example using MICROSOFT™ stock.

In regard to FIG. 3, you access the Market Sentiment Curve over the Internet. You click on a pull-down menu on the Market Sentiment Curve and select MICROSOFT's™ ticker symbol. The following information appears on the curve: Price Per Share (Pps): $26.92; Sentiment Index (Si): 1.65; Sentiment Quotient (Sq): 0.62 and profit growth over one year (CpΔ): 0.49. As these metrics appear on the Curve, the following analysis and interpretation are automatically displayed:

A Sentiment Index of 1.65 indicating that the market's sentiment towards MICROSOFT™ is POSITIVE.

A Sentiment Index of 1.65 also means that priced into MICROSOFT's™ stock is a market expectation that MICROSOFT's™ operating performance (Profit) will increase by 165% over a year.

A Sentiment Quotient of 0.65 means that 65% of the current stock price is derived from Market Sentiment.

MICROSOFT™ actual one year profit growth is 49%

Considering that the Si (1.65) is greater than its profit growth (0.49) AND its Sq (0.62) is greater than 0.5, the current market value is classified as BUBBLE and a color code of RED is assigned.

Clicking on the buttons on the lower right hand corner of the Market Sentiment Curve will give you the ability to view the valuation metrics for the market as a whole, and the sector and industry with which MICROSOFT™ is associated. The Market Sentiment Curve also gives you the ability to do historical analysis and gain insight from trend analysis. The application as applied to the present invention automatically displays the metrics, analysis, and classifications when you click on one of the buttons.

Figure 4:
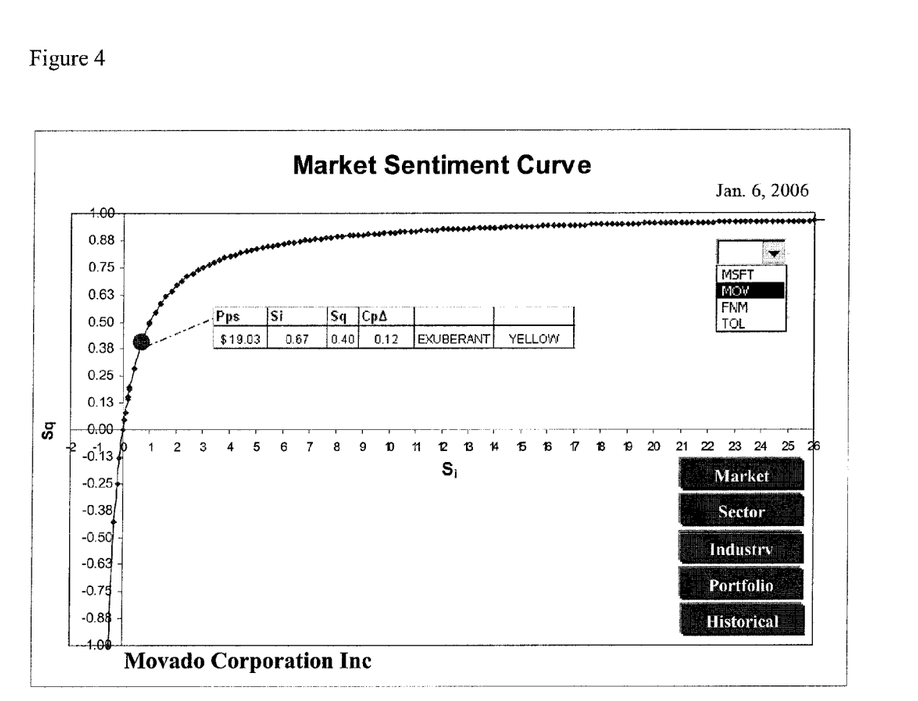
FIG. 4 is an embodiment of the Market Sentiment Curve as applied to the present invention pertaining to an example using MOVADO™ stock.

Continuing this example onto the view in FIG. 4, you access the Market Sentiment Curve over the Internet. You click on a pull-down menu on the Curve and select MOVADO's™ ticker symbol. The following information appears on the curve: Price Per Share (Pps): $19.03; Sentiment Index (Si): 0.67; Sentiment Quotient (Sq): 0.40 and profit growth over one year (CpΔ): 0.116. As these metrics appear on the Market Sentiment Curve, the following analysis and interpretation are automatically displayed:

A Sentiment Index of 0.67 indicating that the market's sentiment towards MOVADO™ is POSITIVE.

A Sentiment Index of 0.67 also means that priced into MOVADO's™ stock is a market expectation that MOVADO's™ operating performance (Profit) will increase by 67% over a year.

A Sentiment Quotient of 0.40 means that 40% of the company's current stock price is derived from Market Sentiment.

MOVADO™ actual one year profit growth is 11.6%

Considering that the company's Si (0.67) is greater than its profit growth (0.116) AND its Sq (0.40) is greater than 0, the current market value is classified as EXUBERANT and a color code of YELLOW is assigned.

Clicking on the buttons on the lower right hand corner of the Market Sentiment Curve will give you the ability to view the valuation metrics for the market as a whole, and the sector and industry with which MOVADO™ is associated. The Market Sentiment Curve also gives you the ability to do historical analysis and gain insight from trend analysis. The application automatically displays the metrics, analysis, and classifications when you click on one of the buttons.

Figure 5:
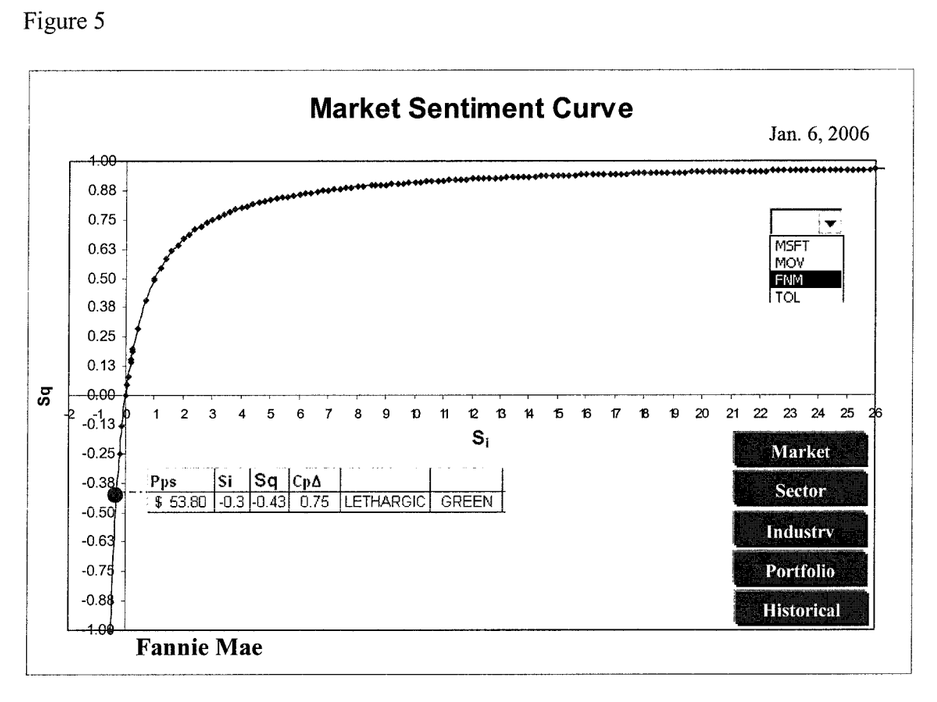
FIG. 5 is an embodiment of the Market Sentiment Curve as applied to the present invention pertaining to an example using FANNIE MAE™ stock.

In regard to FIG. 5, you may access the Market Sentiment Curve over the Internet. You click on a pull-down menu on the Curve and select FANNIE MAE TM ticker symbol. The following information appears on the curve: Price Per Share (Pps): $53.80; Sentiment Index (Si): −0.30; Sentiment Quotient (Sq): −0.43 and profit growth over one year (CpΔ): 0.749. As these metrics appear on the Market Sentiment Curve, the following analysis and interpretations are automatically displayed:

- A Sentiment Index of −0.30 indicating that the market's sentiment toward the company is NEGATIVE.
- A Sentiment Index of −0.30 also means that priced into the company's stock is a market expectation that FANNIE MAE's™ operating performance (Profit) will decrease by 30% over a year.
- A Sentiment Quotient of −0.43 means that 43% of Market Sentiment value is not reflected in the company's current stock price.
- FANNIE MAE™ actual one year profit growth is 74.9%
- Considering that the company's Si (−0.30) is greater than its profit growth (0.749) AND its Sq (−0.43) is less than 0, the company's current market value is classified as LETHARGIC and a color code of GREEN is assigned.

Clicking on the buttons on the lower right hand corner of the Market Sentiment Curve will give you the ability to view the valuation metrics for the market as a whole, and the sector and industry with which the company is associated. The Market Sentiment Curve also gives you the ability to do historical analysis and gain insight from trend analysis. The application automatically displays the metrics, analysis, and classifications when you click on one of the buttons.

Figure 6:
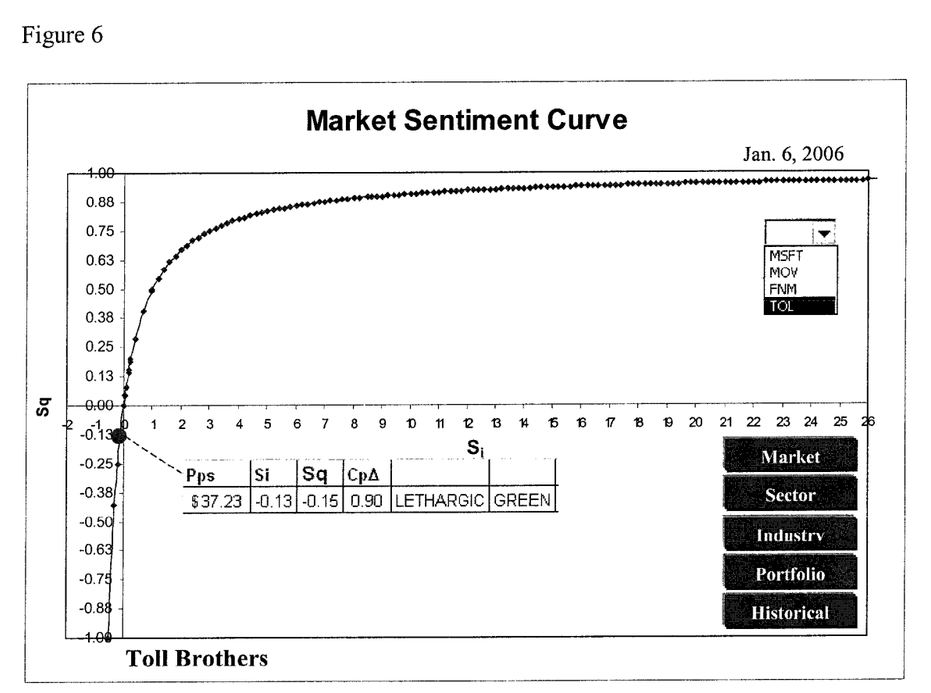
FIG. 6 is an embodiment of the Market Sentiment Curve as applied to the present invention pertaining to an example using TOLL BROTHERS™ stock.

In regard to FIG. 6 of the present invention, you may access the Market Sentiment Curve over the Internet. You click on a pull-down menu on the Curve and select TOLL BROTHERS'™ ticker symbol. The following information appears on the curve: Price Per Share (Pps): $37.23; Sentiment Index (Si): −0.13; Sentiment Quotient (Sq): −0.15 and profit growth over one year (CpΔ): 0.902. As these metrics appear on the Market Sentiment Curve, the following analysis and interpretation are automatically displayed:

- A Sentiment Index of −0.13 indicating that the market's sentiment toward the company is NEGATIVE.
- A Sentiment Index of −0.13 also means that priced into the company's stock is a market expectation that TOLL BROTHERS'™ operating performance (Profit) will decrease by 13% over a year.
- A Sentiment Quotient of −0.15 means that 15% of Market Sentiment value is not reflected in the company's current stock price.
- TOLL BROTHERS™ actual one year profit growth is 90.2%
- Considering that the company's Si (−0.13) is greater than its profit growth (0.902) AND its Sq (−0.15) is less than 0, TOLL BROTHERS'™ current market value is classified as LETHARGIC and a color code of GREEN is assigned.

Clicking on the buttons on the lower right hand corner of the Market Sentiment Curve will give you the ability to view the valuation metrics for the market as a whole, and the sector and industry with which the company is associated. The Market Sentiment Curve also gives you the ability to do historical analysis and gain insight from trend analysis. The application automatically displays the metrics and analysis when you click on one of the buttons.

The present invention is not solely limited to the embodiments described above, but is also all variations, as well as those embodiments within the scope of the following claims.

I claim:

1. A method of making investment decisions, comprising:
    obtaining data pertaining to the company;
    using a computer with an Internet connection to calculate a Sentiment Index for the stock price and a Sentiment Quotient for the stock price;
    calculating the Sentiment Index for the stock price according to the following steps:
        multiplying a price per share by a rate of return to obtain a product;
        subtracting an earnings per share from the product to obtain a difference; and
        dividing the difference by the earnings per share;
    calculating the Sentiment Quotient for the stock price according to the following steps:
        calculating the definite integration from 0 to the Sentiment Index of 1 divided by the squared sum of the Sentiment Index and 1; and
    generating and displaying an investment decision based on the Sentiment Quotient.

2. The method of claim 1, wherein said obtaining data pertaining to the company is operating information available about the company.

3. The method of claim 1, further comprising graphing the Sentiment Index versus the Sentiment Quotient.

4. The method of claim 1, further comprising graphing the Sentiment Index versus the Sentiment Quotient.

5. The method of claim 1, further comprising determining the Sentiment Quotient versus time.

6. The method of claim 2, further comprising determining the Sentiment Quotient versus time.

* * * * *